Jan. 11, 1955   E. B. ROBINSON   2,699,099
APPARATUS FOR PRODUCING HELICALLY WOUND CYLINDERS
Filed May 29, 1952   9 Sheets-Sheet 1

Inventor
ERNEST BRADBURY ROBINSON
By Howson and Howson
His Attorneys

Jan. 11, 1955     E. B. ROBINSON     2,699,099
APPARATUS FOR PRODUCING HELICALLY WOUND CYLINDERS
Filed May 29, 1952     9 Sheets-Sheet 3

Inventor
*ERNEST BRADBURY ROBINSON*
By
*Howson and Howson*
His Attorneys Jan. 11, 1955  E. B. ROBINSON  2,699,099
APPARATUS FOR PRODUCING HELICALLY WOUND CYLINDERS
Filed May 29, 1952  9 Sheets-Sheet 5

ERNEST BRADBURY ROBINSON
Inventor

By Howson and Howson
His Attorneys

Jan. 11, 1955   E. B. ROBINSON   2,699,099
APPARATUS FOR PRODUCING HELICALLY WOUND CYLINDERS
Filed May 29, 1952   9 Sheets-Sheet 7

Inventor
ERNEST BRADBURY ROBINSON
By Howson and Howson
His Attorneys

Jan. 11, 1955

E. B. ROBINSON

2,699,099

APPARATUS FOR PRODUCING HELICALLY WOUND CYLINDERS

Filed May 29, 1952

Inventor
ERNEST BRADBURY ROBINSON

By Howson and Howson
His Attorneys

Jan. 11, 1955   E. B. ROBINSON   2,699,099
APPARATUS FOR PRODUCING HELICALLY WOUND CYLINDERS
Filed May 29, 1952   9 Sheets-Sheet 9

ERNEST BRADBURY ROBINSON
Inventor

By Howson and Howson
His Attorneys

United States Patent Office 2,699,099
Patented Jan. 11, 1955

2,699,099

APPARATUS FOR PRODUCING HELICALLY WOUND CYLINDERS

Ernest B. Robinson, Ashgate, Chesterfield, England

Application May 29, 1952, Serial No. 290,698

11 Claims. (Cl. 93—80)

The invention concerns improvements in or relating to the production of tubes by helical winding and is particularly concerned with that type of machine comprising a mandrel, means for feeding strip material thereto, an endless belt for winding the material helically on the mandrel to form tubing, cutter mechanism, means for traversing the cutter mechanism to and fro axially of the tubing, and means for moving the cutter mechanism laterally towards the tubing to cut the latter during the forward stroke and laterally away from the tubing before the return stroke.

It will be understood that when employing a machine as above it is necessary to ensure that the motion of the cutters is similar for each cutting cycle and is predetermined according to the traverse of the tubing. The object of the invention is to provide a machine particularly suitable for this and other purposes.

The invention provides apparatus for producing cylindrical containers of predetermined length, comprising means for helically winding on a mandrel strip material to form continuously rotating and axially moving tubing, at least one cutter mounted for to-and-fro movements axially and laterally of the tubing, mechanism for moving the cutter to-and-fro axially and laterally of the tubing including hydraulic means for moving the cutter with the tubing in the axial direction, said hydraulic means comprising a reversible hydraulic motor, a hydraulic circuit for supplying hydraulic fluid thereto, and valve means in said circuit for controlling the supply of the fluid to start, continue and stop the traverse of the cutter with the tubing in the axial direction, in combination with automatic means for actuating said valve means periodically.

The invention also provides a machine as above having means for controlling the hydraulic means to obtain suitable motion characteristics of the cutters. Conveniently for this purpose means such for example as an adjustable relief valve is provided for controlling the flow of the hydraulic fluid. Cutters are conveniently provided on each side of the tube, one set being slidable and the other set being pivotal, there being suitable connecting means between them. Hydraulic, pneumatic or other suitable means and preferably pneumatic means may move the cutters laterally (against spring means if desired) and the cutters may be adjustable. One or more power operated rams may operate the cutters. The invention can be used on either single cut or gang cut winders.

Means may be provided whereby, during operation of the machine cutting action of the cutters and production of the tubing may each be prevented independently of the other for starting up and other purposes.

Adjustment means are provided for ensuring that cutting takes place only in that part of the cutter stroke when the cutters are traversing at the speed of the tubing.

Means are also provided whereby the cutters return at a greater speed than the forward speed.

There is conveniently provided a hollow mandrel from which a subsidiary mandrel projects and is rotated and traversed with the tubing at speeds which may be varied.

Means may be provided for giving local support to the mandrel in the region of the cutters during cutting.

Means are preferably provided for synchronizing the forward speed of the cutters with the rate of tube production.

Means are also preferably provided for ensuring that the cutters are in contact with the tube for a sufficient amount of tube rotation to complete severance.

The above and other features of the invention are disclosed in the detailed description given by way of example of the particular embodiments illustrated in the accompanying drawings in which.

Figure 1:
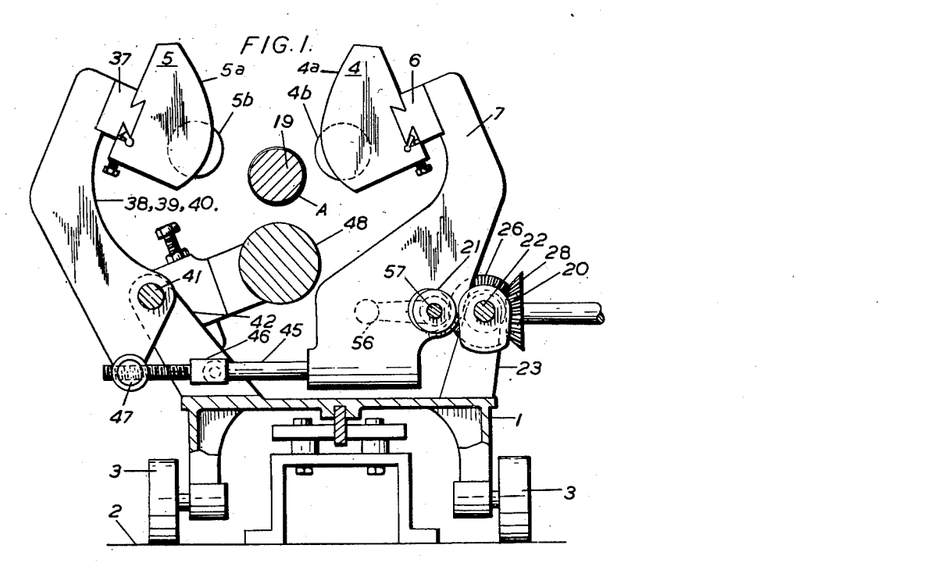
Figures 1 to 5 are detail views of cutter mechanism.
Figure 2:
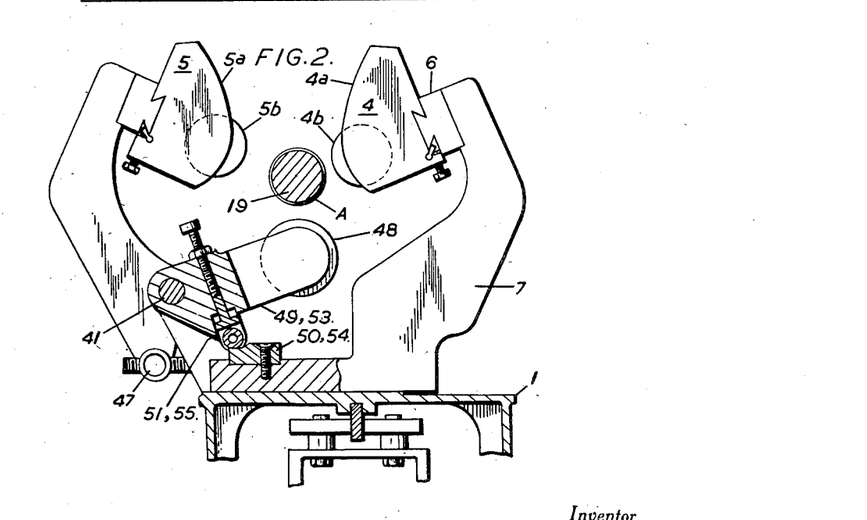
Figure 3:
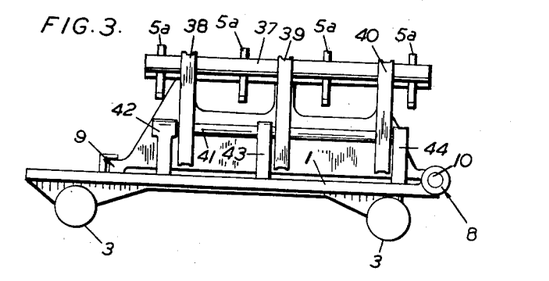
Figure 4:
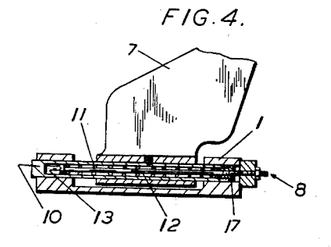
Figure 5:
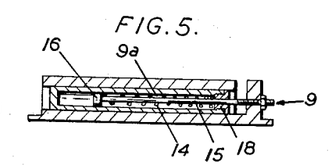
Figure 6:
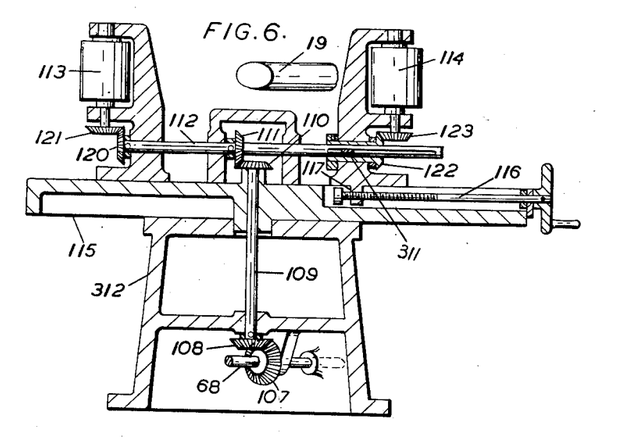
Figure 6 is a detail view of winding belt driving means.

Referring now particularly to Figures 1 to 7 a cutter carriage 1 is mounted on four wheels 3 designed to obtain free running on a track 2, and on the cutter carriage 1 are mounted two banks of cutters 4 and 5 for cutting tube indicated at A. The cutter bank 4 comprises a plurality of cutter holders 4a (each carrying cutter 4b) adjustably slidable on a bar 6 which in turn is fastened to a sliding member 7 having three arms 7a (Figure 7) to support the bar 6. The sliding member 7 is arranged to slide laterally across the tube A by the provision of guides 8 and 9 (Figure 3). Guide 8 is shown sectioned in Figure 4, from which it will be seen that the sliding member 7 is attached by a grub screw to a bar 10 of circular cross section, arranged to slide in close fitting holes in cutter carriage 1. Inside the bar 10 is a hollow chamber containing a spring 11 and a rod 12 screwed at one end, and having an enlargement 13 at the other end. The plug 17 serves to contain the spring 11 in a compressed state, and this enables the initial compression of the spring to be adjusted as required. The guide 9 (Figure 5) is of rectangular type, having similar spring compression to guide 8 by consisting of a hollow chamber 9a of circular cross section containing a spring 14, and a rod 15 screwed at one end and having an enlargement 16 at the other end. A plug 18 serves to contain the spring 14 in a compressed state. The springs in guide 8 and 9 serve to maintain the cutter bank 4 out of engagement with the cutting mandrel 19 (Figure 1) except when the cutters are forced inwards by cams 20 (see also Figure 7) operating on rollers 21 (Figure 1). Cams 20 are fixed to a cam shaft 22, which is free to rotate but not to slide in bearings 23 and 24 which are mounted on the cutter carriage. This arrangement ensures that the cam shaft 22 moves longitudinally with the cutter carriage. Cam shaft 22 has a key 25 (Figure 10) of a length in excess of the maximum desired longitudinal cutter carriage movement, and this key 25 slides longitudinally in the boss of a bevel gear 26 which is retained axially and free to rotate in a bracket 27; this bracket 27 is mounted on a bed 60 of the cut off mechanism. A further bevel gear 28 is keyed to a shaft 29 which rotates in bracket 27 so that the bevel gears 26 and 28 engage. It will be seen that rotation of the shaft 29 at the desired time, will produce lateral movement of the cutter bank 4, either inwards or outwards, according to the direction of rotation.

Figure 21:
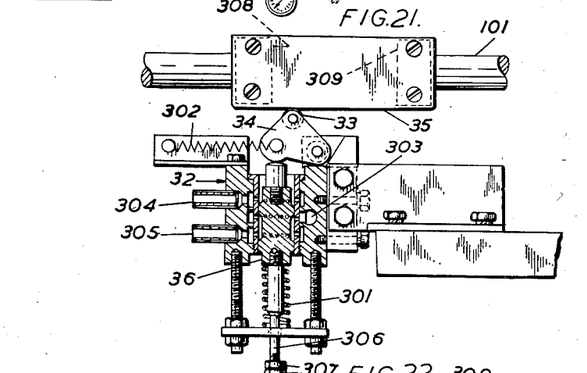
Figure 21 is a detail of a pneumatic valve and valve actuating means for lateral movement of the cutters.

Cutting should take place when the cutter carriage has reached the speed at which the tube A is being produced and should cease before the cutter carriage slows down at the end of its stroke. A system is shown whereby a pneumatic ram 30 (Figure 7) has its rod end pivotally attached to a crank 31 and its cylinder end pivotally attached to bed 60. The crank is keyed to the shaft 29. The operation of the pneumatic ram 30 is controlled by a valve 32 whose porting may be seen by reference to i. e., the porting will be such as to cause the piston rod Figure 21. When the cutter banks 4 and 5 are in the cutting position, the valve will be as shown in Figure 21, of the ram 30 to be extended.

The various positions of a striker plate 35 which is carried by a rod 101 projecting from the cutter carriage 1 and a lever 34 carried by the valve 32 for controlling the operation of valve 32 are shown in Figures 23, 24, 25, 26, 27 and 28.

Figures 23, 24:
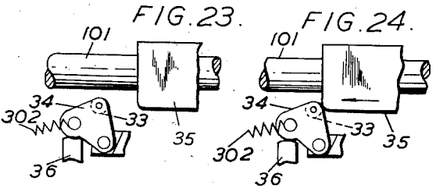
Figures 23, 24, 25, 26, 27 and 28 show successive stages in the operation of the pneumatic valve.

Figure 23 shows the relation between the striker plate 35 and a roller 33 on lever 34 when the cutter carriage is in its rearward position and at rest.

Figure 24 shows the striker plate 35 making initial contact with the roller 33 on lever 34 just after commencement of the forward stroke of the cutter carriage.

Figure 25:
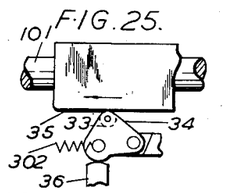

Figure 25 shows the relation between the striker plate 35 and the roller 33 on the lever 34 at any point during its forward stroke when the cutters are in engagement with the tube.

Figure 26:
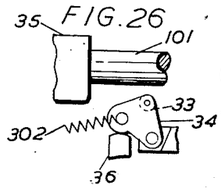

Figure 26 shows the relation between the striker plate 35 and the roller 33 on lever 34 at the end of the forward stroke, the valve spindle 36 being in its top position, and no longer under the influence of the striker plate 35.

Figure 27:
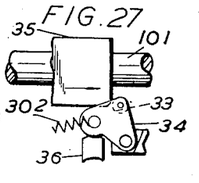

Figure 27 shows the striker plate making initial contact with the roller 33 on the lever 34 just after commencement of the rearward stroke of the cutter carriage.

Figure 28:
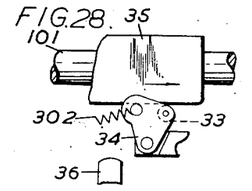

Figure 28 shows the relation between the striker plate 35 and the roller 33 on lever 34 during the return stroke of the cutter carriage. The striker plate 35 forces the lever 34 out of contact with the valve spindle 36.

When the cutter carriage is in its rearward position and at rest, the valve spindle 36 is in its top position (see Figure 23) and the pressure of the compressed air supply is applied to the cylinder side of the piston of ram 30 and the ram 30 is in the extended position.

When the cutter carriage commences its forward stroke the striker plate 35 strikes roller 33 (see Figure 24). Further forward movement of the striker plate causes the lever 34 to pivot and to depress the valve spindle 36 (see Figure 25 and Figure 21) causing the pressure of the compressed air supply to be applied to the rod side of the piston, and the air on the cylinder side is allowed to exhaust.

The ram 30 assumes a closed position and brings the cutter bank 4 (and consequently the cutter bank 5 in a manner to be hereinafter referred to) into engagement with the formed tube A on the mandrel 19. When the cutter carriage is near the end of its forward stroke, and before the carriage is slowed down the striker plate 35 passes out of engagement with the roller 33 and the valve spindle 36 assumes its top position due to the bias of a spring 301, and the pressure of the compressed air supply is once more applied to the cylinder side of the piston and the air on the rod side of the piston is allowed to exhaust (see Figure 26).

After the cutter carriage has come to rest at the end of the forward stroke and started on its return stroke, the striker plate 35 strikes the roller 33 (see Figure 27) and causes the lever 34 to move out of engagement with the valve spindle 36 (see Figure 28) so that during the return stroke the cutters remain out of engagement with the mandrel. Near the end of the return stroke the striker plate 35 passes out of engagement with roller 33 and the lever 34 comes back into light engagement with the valve spindle 36, due to the bias of a light spring 302 (see Figure 23).

Figure 22:
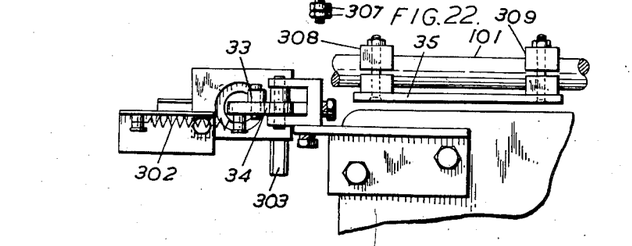
Figure 22 is a further view of parts shown in Figure 21.

The ram 30 may be operated from any convenient high pressure air supply under control of said valve 32, and reference to Figures 21 and 22 show that the valve 32 may be a conventional type of pneumatic valve adapted to be controlled by said striker plate 35, such adaptation including for example said lever 34 and other parts referred to herein. A spring 301 normally maintains the valve spindle 36 in its top position so that the pressure of the compressed air supplied to an inlet port 303 is applied to the cylinder side of ram 30 via a port 304. Compressed air on the rod side of the ram is allowed to exhaust via port 305. Depression of the valve spindle 36 reverses the porting. A valve spindle extension 306 is screw threaded at its lower end and has lock nuts 307 to allow initial adjustment of the valve. In an alternative arrangement the pneumatic system may be replaced by a hydraulic system or other suitable means.

Figure 8:
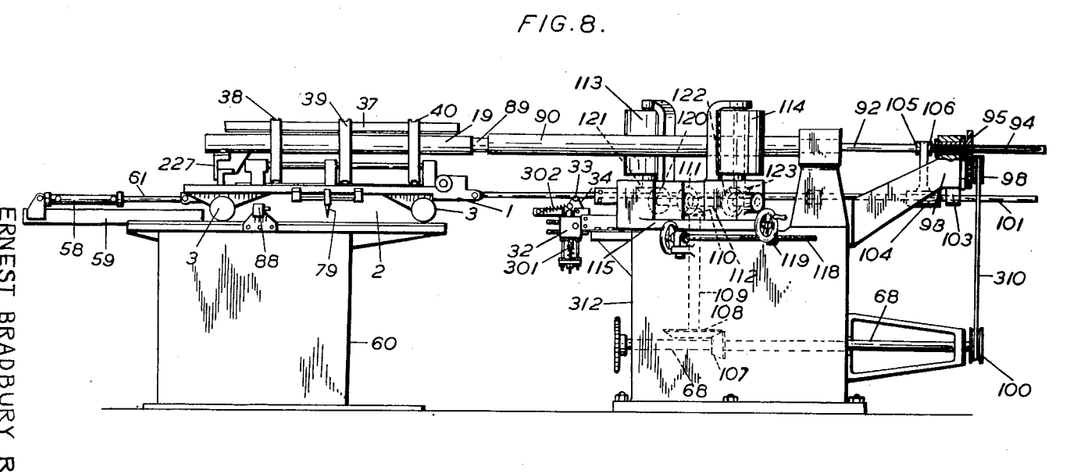
Figure 8 is a general side view of the machine.

The assembly of valve 32 is conveniently attached to the frame of the tube winder (see Figures 8, 21 and 22). The striker plate 35 is attached to said rod 101 by adjustable clamps 308 and 309. By providing different lengths of striker plate 35 and by positional adjustment of the striker plate and the rod 101 (by said clamps 308 and 309), the cutters can be made operative for any required part of the forward traverse of the cutter carriage, thus ensuring complete circumferential severance of tubing of any desired linear pitch of helixes.

A second bank of cutters 5 (Figures 1 to 3) is provided, adjustably mounted on a bar 37 connected to arms 38, 39 and 40 and comprising cutter holders 5a each carrying cutter 5b. The arms are pinned to shaft 41, the shaft being rotatable in bearings situated in the pedestals 42, 43 and 44. These bearing pedestals 42, 43 and 44 are integral with the cutter carriage 1. Referring to Figure 1 it will be seen that both cutter banks 4 and 5 are able to approach or withdraw from the mandrel 19 in step with each other, due to the linkage provided. Three sets of linkage are provided, one being attached to each of the arms 38, 39 and 40. Each set of linkage consists of a rod 45 attached at one end to the sliding member 7 and having an eye at the other end, and a screwed fork having its screwed portion passing through a pivoting nut 47, attached to each of the arms 38, 39 and 40, the forked end being pin jointed at 46 to the eye of rod 45. This system provides a means of adjusting cutter bank 5 towards and away from the mandrel, and the cutters of each bank may conveniently be of conventional type each incorporating means of adjusting the individual cutters towards and away from the mandrel; by this means the necessary setting of the cutters may be obtained relatively to the mandrel.

In order that cutting may be suspended at any time without the need for stopping the winding of tube, a handle 56 is provided for moving the centres of rollers 21 in an eccentric fashion by pivoting about a point marked 57 so that cutter banks 4 and 5 are caused to retract an amount sufficient to ensure that when the ram 30 is in the closed position as required for cutting, the cutters are still out of contact with the formed tube A.

In order that there shall be no flexure when cutter banks 4 and 5 engage with the winding tube on the cutting mandrel 19, a supporting roller 48 (Figure 2) is provided, attached at each end to two arms 49 and 53 respectively. These arms are able to pivot on shaft 41. The supporting roller 48 is provided with free running bearings to permit easy rotation. When the cutter bank 4 approaches the mandrel 19, cam or profile blocks 50 and 54 attached to the sliding member 7 cause adjustable roller devices 51 and 55 to be displaced, hence causing the supporting roller 48 to be raised a sufficient amount to support the cutting mandrel 19. Screw adjustment is provided on the roller devices 51 and 55 for positioning the supporting roller 48.

Referring to Figure 8, it will be seen that a reversible hydraulic motor shown as a hydraulic ram 58 is mounted with its rod end attached to the cutter carriage 1 and the other end attached to an extension 59 on the bed 60. The ram is fitted so that when the cutter carriage 1 is in its rearward position and at rest, the ram 58 has its piston rod fully extended. Oil ways 62 and 63 (Figure 10) are provided for transfer of oil to and from the cylinder of the ram 58.

Figures 7, 10:
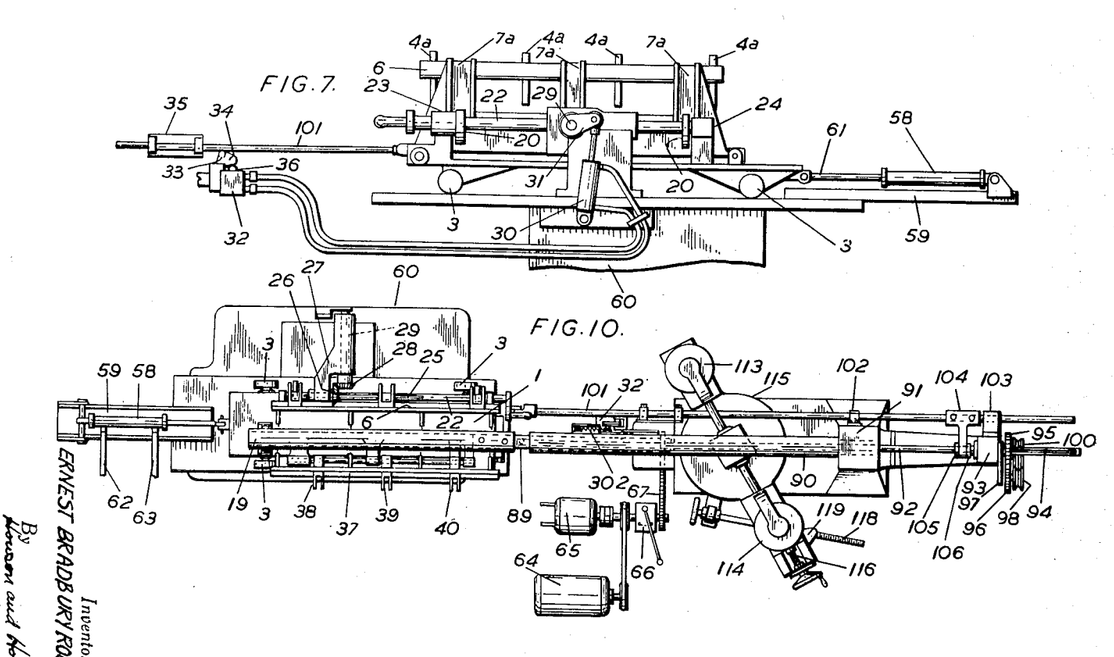
Figure 7 is a detail view of means for moving the cutters laterally.
Figure 10 is a general plan view of the machine.

Referring to Figure 10, a main drive electric motor 64 is provided for driving the tube winder, the cutting mandrel 19, and a variable delivery hydraulic pump 65. A clutch mechanism 66 is provided for engagement and disengagement of the drive to the tube winder and cutting mandrel. A chain drive 67 is provided for taking the drive from the output side of the clutch to the shaft 68 on the tube winder.

Figure 13:
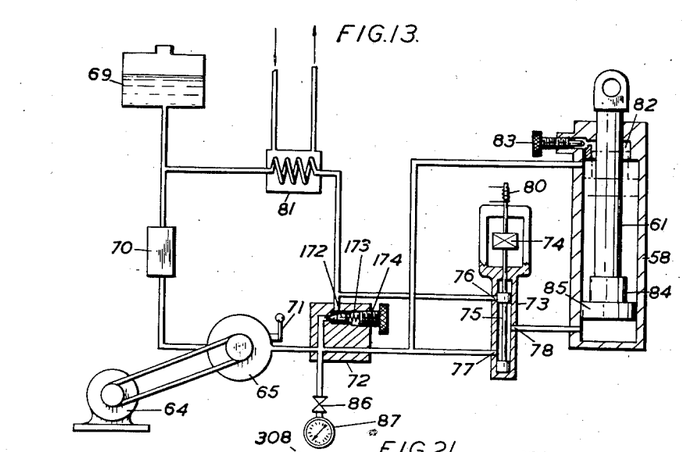
Figure 13 is a diagram of a suitable hydraulic circuit.

The hydraulic circuit for the traverse of the cutter carriage is shown in diagrammatic form in Figure 13. Referring to Figure 13 an oil reservoir 69 is provided and a pipe leads therefrom to a filter unit 70, and from this unit a pipe leads to the inlet side of the variable delivery hydraulic pump 65. The hydraulic pump is of a type having a high volumetric efficiency at both high and low pressures. A lever 71 is provided for varying the delivery of the pump and may be locked in any position to maintain the volumetric output at any desired rate. A relief valve 72 is provided on the delivery side of the pump to ensure that the pressure in the system does not exceed a predetermined value though of course, it may fall below this value as will be seen later. The pressure setting of the valve is adjustable and for convenience a simple screw 172, spring 173 and cone ended peg 174 is shown. A valve 73 is provided to control the flow to the ram 58. A weight 74 is attached to the valve spindle 75 to ensure that the spindle naturally adopts the position shown in the diagram where exhaust port 76 is closed and ports 77 and 78 are open allowing fluid to pass through the valve to the cylinder. When the solenoid 80 (operated from control marks as described in my U. S. Letters Patent No. 2,623,445, dated December 30, 1952, to which reference is directed for full details) is de-energised the valve spindle 75 falls to its lower position, under the influence of weight 74, opening port 77 and closing port 76. Port 76 is connected by a pipe to the relief side of relief valve 72 and the scavenged fluid passes through a cooler 81 (cooled by water) to join the supply from the reservoir on the inlet side of the filter and pump.

The ram 58 embodies a cushioning device at the rod end to reduce shock when the cutter carriage 1 is brought to rest after completing its return stroke. This cushioning device consists of a chamber 82, having an adjustable throttling valve 83. The cushioning device comes into action when the piston rod 61 enters the chamber 82, trapping fluid which can only escape through the adjustable throttling valve 83. The rate of the escape is governed by the size of the valve orifice and it is a simple matter to arrive at a condition where the rod is brought to rest without shock. The throttling valve 86 and the pressure gauge 87 are provided to indicate the pressure at any time in the system.

The operation of the hydraulic circuit is as follows:

Consider the condition where the cutting mechanism is in its rearward position and at rest awaiting the impulse from the electronic equipment observing on the strip or tube to initiate cutting. In this condition the hydraulic pump 65 is running at a constant speed, being driven by motor 64, and is delivering fluid at a constant rate. All this fluid enters the relief valve 72. The solenoid operated valve 73 is in the position shown in Figure 13, i. e. with the spindle in its lowest position. The ram 58 is in its fully extended position. In this "at rest" condition the piston 85 will be under pressure on both sides, but since the effective area of the cylinder side of the piston is greater than the effective area of the rod side of the piston (the pressure on the rod side being effective only on an annulus), the ram will remain in its fully extended condition and the whole of the delivery from the pump will be by-passed by the spring loaded relief peg 174 and will pass through the cooler 81 into the inlet side of the filter. The pressure in the system will correspond to the setting of the relief valve 72 and will be indicated by pressure gauge 87.

When an impulse is received from the control mark on the moving tube or strip (as referred to in said Patent 2,623,445), solenoid 80 is energised, raising valve spindle 75 together with weight 74, closing port 77 and opening port 76. It will be seen that the fluid on the cylinder side of piston 85 is now free to exhaust to the cooler, via ports 78 and 76 which are now interconnected, and is subject only to atmospheric pressure. Port 77 will be closed so that the delivery of the pump will be temporarily shared between the rod side of the piston 85 and the by-pass side of the relief valve 72. The cutter carriage will commence to move forward with accelerating motion until it reaches such a speed that the ram accepts the full delivery of the pump, and the relief valve closes, when it will continue its motion at a uniform speed. The force required to maintain the cutter carriage at this uniform speed is less than is required during the period of acceleration and the pressure in the system will fall below the setting of the relief valve 72. This will have the effect of applying constant pressure to the rod side of the piston causing acceleration. When the piston reaches constant speed i. e. at which it will take the full delivery of the pump, the pressure in the system falls below the setting of the relief valve 72, causing the relief valve 72 to close. The piston continues to move causing continued retraction of the ram and consequent forward movement of the cutter carriage. When the cutter carriage has reached a predetermined point, striker 79 actuates re-set switch 88 causing the solenoid 80 to be de-energised in a manner which will be described more fully in later reference to the electronic circuit. This allows weight 74 to fall, taking valve spindle 75 to its lower position. This causes reversal of the piston motion and any sudden pressure surge in the system will be accommodated by the relief valve 72. When the piston moves in the opposite direction, causing extension of the ram, the fluid from the rod side of the piston joins that being delivered from the pump, causing the actual supply to the cylinder side of the piston to be the sum of the amount delivered by the pump and the amount displaced from the rod side of the piston. This means that during the return stroke, the carriage will travel at a faster rate than during the forward stroke. This feature is often desirable as it enables the total time of the cutting cycle to be reduced and enables a smaller bit of tube to be within the capacity of the machine, than would otherwise be the case. The ram continues to extend until the enlargement of the piston rod 84 enters the cushioning chamber 82 which, due to the constriction caused by the adjustable throttling valve 83, brings the piston to rest in a smooth manner free from shock. In this condition the system is ready for initiation of the next cutting cycle, and it will be appreciated that the motion characteristics of the cutter carriage during each cutting cycle will be substantially similar.

The mandrel consists basically of two parts (Figure 10), a fixed portion 90 on which the winding of the tube takes place and the part 19 having rotational sliding motion on which the cutting takes place.

Figure 11:
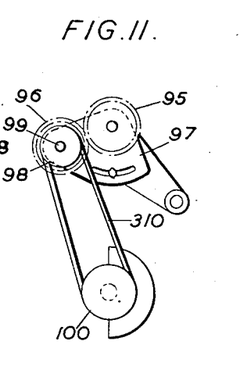
Figure 11 is a detail of mandrel driving means.

The cutting mandrel 19 is made of hardened steel having a bronze attachment 89 sliding within and rotating relative to the fixed winding mandrel 90 which is attached to the head stock 91 of the winding machine. Rotational and sliding movement is imparted to the cutting mandrel 19 by means of a shaft 92 which is pegged to the cutting mandrel 19 at one end and passes through a bracket 93 mounted on the rear end of the tube winding machine. The rear end of the shaft 92 carries a long key 94 (Figure 8) which passes through the hub of gear 95. Gear 95 is capable or rotating within the bracket 93, but is retained relative thereto in a longitudinal sense. The gear 95 is driven by a further gear 96 mounted on a quadrant 97 (Figure 11). The gear 96 is attached to a V pulley 98 and rotates on a stub 99 mounted in the quadrant 97. The quadrant is capable of limited angular adjustment about the centre of shaft 92 so that V belt 310 may be properly tensioned. The V pulley 98 is belt driven from a further V pulley 100, which is of the adjustable type enabling an infinite variation of speed within its range. The adjustable V pulley 100 is mounted on the end of the drive shaft 68, this enables the cutting mandrel 19 to be rotated at a speed similar to the rotational speed of the being formed tube. This feature is of great assistance in producing clean and easy cutting without damage to the tube as the cutting mandrel 19 is able to drive the tube when the cutter banks 4 and 5 are in contact.

Figure 9:
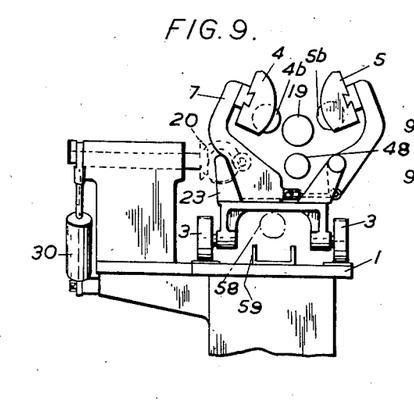
Figure 9 is a general end view of the cutting mechanism.

Longitudinal movement of the mandrel is also provided for, this being attained by means of a rod 101 (Figures 9 and 10) attached to the cutter carriage 1 passing through supporting guides 102 and 103. Rigidly attached to the rod 101 is bracket 104 which also engages with bosses 105 and 106 on the shaft 92. It follows therefore that the cutting mandrel 19 will move in unison with the cutter carriage 1.

The tube winder consists of a shaft 63 driven in this case by motor 64 through clutch 66 and chain drive 67. A pair of bevel gears 107 (Figure 6) and 108 transmit the drive to the vertical shaft 109 at the uppermost end of which is a bevel gear 110 driving a further bevel gear 111 keyed to a horizontal shaft 112. From thereon the drive is transmitted by further bevel gears 120 and 121 to belt pulley 113 and by a further pair of bevel gears 122 and 123 to belt pulley 114. Bevel gear 122 has a sliding key 311. These pulleys are used to drive the belt for winding the tube on the mandrel 90. Belt pulley 113 is fixed on the rotating bed 115 while belt pulley 114 is capable of radial adjustment about the centre of rotation of the rotating bed 115, by means of a screw 116 operating in a nut 117. Rotational adjustment of bed 115 is essential to obtain the correct angle of winding for the tube, and is achieved by means of screw 118 and nut 119 attached to the machine base 312 and the rotating bed 115 respectively.

Figures 18, 19, 20:
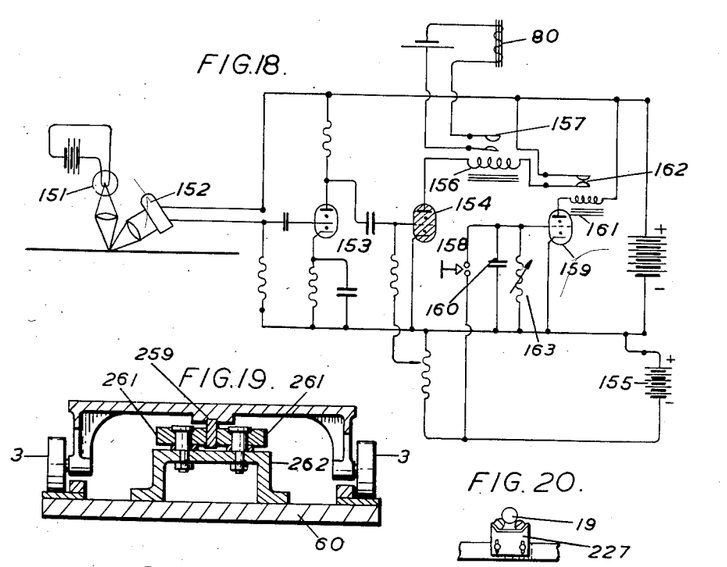
Figure 18 is a circuit diagram of electric control means.
Figure 19 is a cross section of cutter mounting means.
Figure 20 is a detail of mandrel support means.

Figure 19 shows an arrangement including guides for the cutter carriage 1 so preventing lateral displacement of the cutter carriage relatively to the bed 60 of the cutting mechanism. Along the centre line of the cutter carriage at each end is mounted a rectangular bar 259. Each bar runs between a pair of rollers 261. Each pair of rollers is mounted on a bracket 262 fastened to the bed of the machine.

Figure 20 shows a caster device 227 which is preferably provided to support the extremity of the mandrel 19.

Electric control means for co-operating with control marks on the strip and including the solenoid 80 may be as described in the specification of my Patent No. 2,623,445 or as modified by Patent No. 2,623,443 or the further modified form including the suitable means described in the specification of my co-pending application Ser. No. 290,697, filed May 29, 1952, and one arrangement of which is illustrated in Figure 18 of the accompanying drawings. Briefly in this arrangement by way of example the pattern carries a printed control mark in the normally clear margin at appropriate intervals and the margin is scanned by a light beam from a lamp 151 and photo-electric cell 152 to detect its passage.

The photo-cell is connected to a valve amplifier 153 which amplifies the impulse and in turn impresses it on the grid of a gas relay valve 154 which is normally biassed to an inert non-conducting state from a source of negative potential 155. The valve carries a high speed magnetic relay 156 in its anode circuit with contacts 157 connected to energise the electro-magnet or solenoid 80 which starts the tube cutting cycle on the arrival of the control mark at the point of observation.

The gas filled relay valve is unique for this purpose since it possesses the features of being triggered or fired from a small transient impulse of short duration with an almost inertialess response time, and of remaining in the conducting state until reset by opening the anode circuit or making the anode negative with respect to the cathode potential.

This feature allows the solenoid circuit to be established for sufficient time to allow it to do its work even though the initiating impulse may be of only microsecond duration.

Whilst the opening of the anode circuit to reset the relay can conveniently be carried out momentarily (by contacts associated with the travel of the cutter or the tube), it has been found more convenient to employ such contacts 158 to operate in the circuit of a further valve 159 where they initiate the charge (or discharge) of a condenser 160 which in turn governs the period that a further electro-mechanical relay 161 opens its contacts 162 contained in the anode circuit of the gas filled relay valve 154.

By suitable variation of either the charging voltage, capacity of the condenser 160 or discharge resistance 163, or all three, the time before the circuit is reset can be varied at will and the equipment made to respond to every mark, alternate marks, or every third mark etc., according to the output requirements. In addition the control gear can be made inert until just before the control mark arrives and consequent inaccurate operation due to marks or blemishes on the paper avoided.

The photo-electric cell employed may be a device of high impedance such as a vacuum or gas filled emission type photo-cell, or alternatively, a conduction type cell such as the selenium cell (with or without the addition of light filters).

Figure 14:
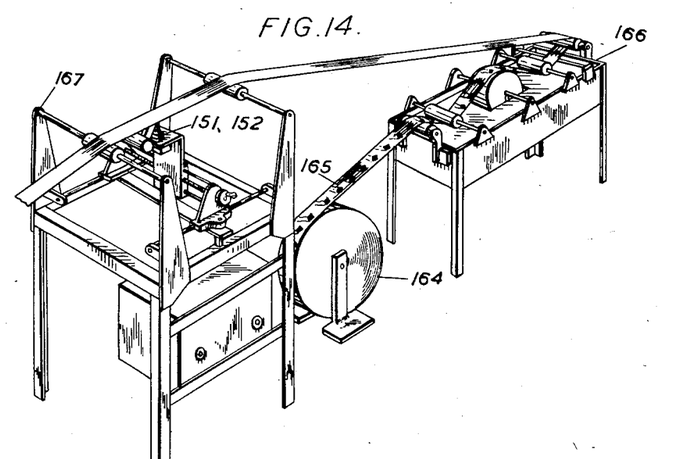
Figures 14 to 17 show strip gumming means and electric control means.
Figure 15:
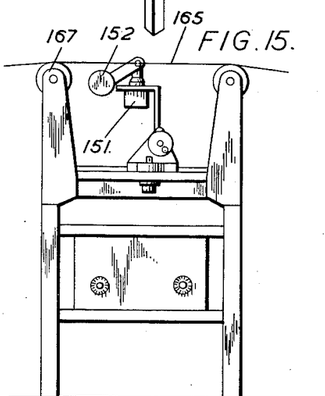
Figure 16:
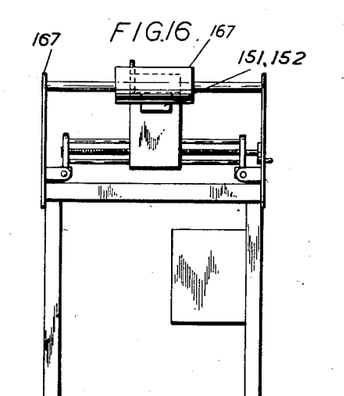
Figure 17:
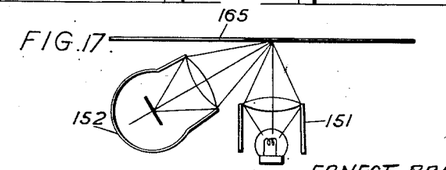

The pattern bearing strip material is conveniently fed from a supply 164 (Figure 14) the strip 165 passing through a gumming unit 166 and over a unit 167 which carries the cell 152 and lamp 151 in an adjustable manner conveniently as fully described in the specification of said patent application Ser. No. 290,697, filed May 29, 1952 and as further illustrated in Figures 15 and 16, the cell 152 and lamp 151 being conveniently disposed as shown in Figure 17.

Figure 12:
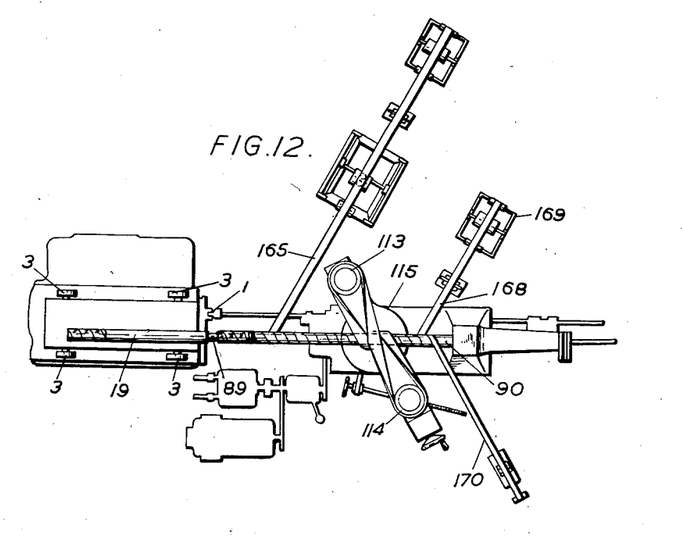
Figure 12 is a further plan view showing strip feeds to the machine.

It is to be understood that one or more strips may be employed, for example there may be three strips as in the manner shown in Figure 12, the strip 165 in this example having gum applied to it and the pattern printed on it whilst the strip 168 is also gummed by passing through a gumming unit 169 but has no pattern on it; there is also a third strip 170 which does not have gum applied to it and is not patterned.

Before the machine is used, it will be necessary to allow the hydraulic circuit to operate for a short time to enable the hydraulic fluid to attain conditions of stable temperature and viscosity. This is assisted by the means of an oil cooler 81 in which cooling is effected by running water. A quantity of tube should then be produced by the tube winder and the helical angle of winding adjusted by turning the rotating bed 115 by means of adjusting screw 118 co-operating with nut 119. This adjustment should be carried out until the tube produced bears patterns correctly spaced along its length and in agreement with the longitudinal spacing of the cutters in the cutter banks 4 and 5.

The clutch 66 is used to transmit the drive to the tube winder and when it is desired to cease winding, the clutch may be disengaged.

After experimental cuts, it will be necesary to synchronise the forward speed of the cutter carriage with the rate of tube production. This may be achieved by means of lever 71 which will vary the delivery of the pump.

As previously stated it will be necessary to ensure that the aforesaid striker plate is of such length that the cutters are in contact with the tube for a sufficient amount of tube rotation to ensure complete circumferential severance and it will be necessary for this purpose that a striker plate of suitable length will be fitted, to adjust the length of travel of the carriage so that the forward stroke does not terminate before complete severance is achieved and the cutters have been withdrawn from engagement with the tube. This may be achieved by adjustment of the point of attachment of striker 79 to the cutter carriage 1.

At this stage the tube produced should have a satisfactory quality of cut. It will then be necessary to pay attention to the register of cutting with the pattern on the tube. This may be easily adjusted by moving the observing head along the strip so that observation occurs earlier or later as required, causing the cutting to occur earlier or later. When the correct cutting location has been obtained the observing head may be clamped in position.

It may be necessary to adjust the diameter of the variable pulley 100 in order to produce the correct rotational speed of cutting mandrel 19.

As an alternative to observing on the strip, control may be effected by direct observation on the tube formed on the mandrel.

Figure 29:
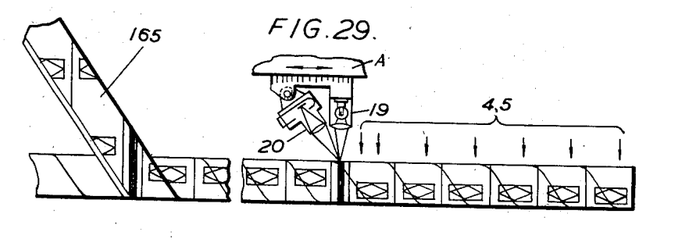
Figures 29 and 30 are detail views of a modified arrangement.
Figure 30:
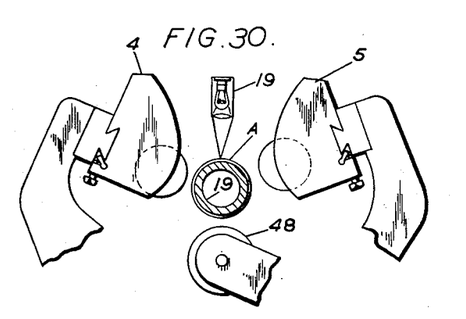

It is further to be understood that the pattern may be disposed on the strip or on any of the strips in such manner that the pattern would be presented either exteriorly or interiorly of the tube, or both, and the strip or any of the strips may be of transparent material; it is also to be understood that detection may take place at any suitable location relatively to the strip material e. g. on either side of the strip before being formed into tubing, or exteriorly or interiorly of the tubing according to requirements; for example detection may take place on the underside of the strip as it travels to the mandrel as shown in Figures 14 to 17, or it may take place on the tubing as illustrated for example in Figures 29 and 30. Referring now to these Figures 29 and 30 the lamp 19 and photo-electric cell 20 is shown observing on top of the tubing but they may be arranged to observe at any suitable location round the circumference of the tubing. The lamp and cell may be mounted conveniently adjustably by any suitable means, and in the example shown, they are mounted on a fixed part 200 of the cutting machine and are adjustable horizontally for setting of the cutting position.

I claim:

1. Apparatus for producing cylindrical containers of predetermined length, comprising means for helically winding strip material on a mandrel to form continuously rotating and axially moving tubing, said strip material having control features thereon, at least one cutter mounted for to-and-fro movements axially and laterally of the tubing, mechanism for moving the cutter to-and-fro axially and laterally of the tubing including hydraulic means for moving the cutter with the tubing in the axial direction of movement of the tubing, said hydraulic means comprising a reversible hydraulic motor, a hydraulic circuit for supplying hydraulic fluid thereto, valve means in said circuit for controlling the supply of the fluid to start, continue, and stop the traverse of the cutter with the tubing in the axial direction, and automatic means for actuating said valve means periodically, in combination with regulating means associated with the moving tubing operable by reference to the control features on the strip material during its movement in the machine for regulating the time of cutting.

2. Apparatus for producing helically wound cylinders of predetermined length, comprising means for helically winding on a mandrel strip material having control features, to form rotating and axially moving tubing having the control features repeated along it, at least one cutter mounted for to-and-fro movements axially and laterally of the tubing, mechanism for moving the cutter in said directions appropriate to cut the moving tubing into bites and including pressure-fluid-operated means for moving the cutter at least with the tubing in the axial direction during the cutting, and control means for controlling operation of the pressure-fluid-operated means with reference to control features on the strip material for regulating at least some of the cuts so that severing is in predetermined relation to the control features.

3. Apparatus for producing helically wound cylinders of predetermined length each having a helically wound unitary pattern thereon, comprising means for helically winding on a mandrel strip material bearing a succession of unitary patterns each approximately equal in wound length to a predetermined container length, surplus trim portions of predetermined length for and surplus to each length of the strip material appropriate to form a given number of containers, and control features, to form continuously rotating and axially moving tubing along which unitary patterns, surplus trim portions, and control features are repeated, at least one cutter mounted for to-and-fro movements axially and laterally of the tubing, mechanism for moving the cutter in said directions appropriate to cut the moving tubing into bites and including pressure-fluid-operated means for moving the cutter at least with the tubing in the axial direction, control means for controlling operation of the pressure-fluid-operated means with reference to control features on the strip material for regulating at least some of the cuts so that severing is in predetermined relation to the wound patterns, with each bite including at least one unitary pattern and surplus material, and means for cutting up the bites each to form at least one container of predetermined length, and with each unitary pattern in substantial registry with a container.

4. Apparatus as claimed in claim 3 wherein the pattern is disposed on the strip or on any of the strips in such manner that the pattern is presented either exteriorly or interiorly of the tubing, or both, and the strip or any of the strips are either of non transparent or transparent material.

5. Apparatus as claimed in claim 3 having an electric detector in the control means for observing control features on the strip material and initiating operation of the pressure-fluid-operated means, and means associated with the moving cutter for controlling its further operation.

6. Apparatus for producing helically wound cylinders of predetermined length, comprising means for helically winding on a mandrel strip material having control features, to form continuously rotating and axially moving tubing having the control features repeated along it, at least one cutter mounted for to-and-fro movements axially and laterally of the tubing, mechanism for moving the cutter in said directions appropriate to cut the tubing into bites and including pressure-fluid-operated means for moving the cutter at least with the tubing in the axial direction during the cutting, control means for controlling operation of the pressure-fluid-operated means for regulating at least some of the cuts by reference to control features on the strip material, and pre-set means associated with the control means for rendering the latter inoperative for predetermined periods.

7. Apparatus for producing helically wound cylinders of predetermined length each having a helically wound unitary pattern thereon, comprising means for helically winding on a mandrel strip material bearing a succession of unitary patterns each approximately equal in wound length to a predetermined container length, surplus trim portions of predetermined length for and surplus to each length of the strip material appropriate to form a given number of containers, and control features, to form continuously rotating and axially moving tubing along which unitary patterns, surplus trim portions, and control features are repeated, at least one cutter, pressure-fluid-operated means for moving the cutter in said directions appropriate to cut the moving tubing into bites, control means for controlling operation of the pressure-fluid-operated means with reference to control features on the strip material for regulating at least some of the cuts so that severing is in predetermined relation to the wound patterns with each bite including at least one unitary pattern and surplus material, pre-set means associated with the control means for rendering the latter inoperative for predetermined periods, and means for cutting up the bites each to form at least one container of predetermined length, and with each unitary pattern in substantial registry with a container.

8. Apparatus for producing helically wound cylinders comprising in combination; winding means for helically winding strip material on a mandrel; at least one cutter mounted for to-and-fro movement axially and laterally of the mandrel; pressure-fluid-operated means for effecting said to-and-fro movements of the cutter; electrical means comprising a detector for observing control features on the strip material, an actuating device operable from the detector to initiate operation of the pressure fluid for effecting the movement of the cutter in the axial direction towards the end of the mandrel, and pre-set means for rendering the actuating device inoperable for predetermined periods; a pressure-fluid-circuit comprising a delivery device for the fluid which is variable for determining the speed of movement of the cutter in the axial direction, control valve means operable by said actuator device, relief valve means which is adjustable for controlling flow of the fluid to obtain a comparatively high rate of acceleration of the cutter and a substantially constant full speed during cutting; and means associated with the movement of the cutter in the axial direction towards the end of the mandrel for automatically operating the pressure fluid-operated-means to effect the movements of the cutter laterally of the mandrel in timed relation with the former movement of the cutter and for automatically re-setting the actuator device for return of the cutter in the axial direction, and said means being adjustable for determining the length of stroke and the timing relationship between the two different movements of the cutter.

9. Apparatus as claimed in claim 8 having hydraulic means for effecting the movement of the cutter in the direction axially of the mandrel and pneumatic means for effecting the movement of the cutter in the direction laterally of the mandrel.

10. Apparatus for producing cylindrical containers of predetermined length comprising means for helically winding on a mandrel strip material having control features, to form continuously rotating and axially moving tubing having the control features repeated along it, a plurality of spaced cutters mounted for simultaneous movement to-and-fro axially and laterally of the tubing, hydraulic means adapted for effecting the to-and-fro movements of the cutter axially of the tubing, pneumatic means adapted for effecting the to-and-fro movements of the cutter laterally of the tubing, said hydraulic and pneumatic means comprising respectively a hydraulic ram and a pneumatic ram operable under control of hydraulic and pneumatic control valves respectively from suitable power sources to effect the respective movements of the cutter, control means for the hydraulic control valve adapted to be operated with reference to control features on the strip material to initiate the forward stroke of the hydraulic ram and also adapted to be operated by means associated with the movement of the cutters in the axial direction with the tubing to initiate return of the hydraulic ram, a variable relief valve in the hydraulic means under control of the hydraulic fluid pressure, due to resistance movements of the hydraulic ram, for obtaining desired motion characteristics of the cutters, and the pneumatic control valve being adapted to be operated by means associated with the movement of the cutters in the direction axially with the tubing to initiate advance and return of the pneumatic ram after the commencement and before the end respectively of that part of the movement of the cutters in the direction axially of the tubing during which the cutters move in the latter direction at full speed.

11. Apparatus of the type for producing cut lengths of tubing which latter is formed in continuity by an endless belt helically winding strip material on a mandrel, comprising a fixed hollow mandrel for having the tubing formed upon it, a subsidiary mandrel onto which the tubing is fed from the hollow mandrel and which is rotatably and longitudinally movable with the tubing by a rod extending through the hollow mandrel, variable drive means for traversing the endless belt and rotating the subsidiary mandrel in desired relationship, key and keyway means in the rod extending through the hollow mandrel and the variable drive means permitting the longitudinal movement of the subsidiary mandrel, a cutter support structure, a trolley or bogey cutter carriage guidably traversible on the cutter support structure under the subsidiary mandrel, a connecting member connecting the cutter carriage to the rear part of the rod extending through the mandrel for simultaneous longitudinal movement of the carriage and subsidiary mandrel, two banks of horizontally spaced and adjustable disc cutters one on each side of the subsidiary mandrel and mounted on the carriage for longitudinal movement therewith, mounting and connecting means for the banks of cutters for lateral movement of both banks for cutting the tubing on the subsidiary mandrel, hydraulic means including a ram connected to the carriage and controlled such that the longitudinal movement of the cutters is for a distance sufficient to ensure severance of the tubing, control means for the hydraulic system to obtain predetermined motion characteristics of the cutters and pneumatic means including a ram adapted to operate cam means and controlled for effecting the lateral movements of the cutters by an operating member movable with the cutter carriage.

References Cited in the file of this patent

UNITED STATES PATENTS

| | | |
|---|---|---|
| 1,491,140 | Holt | Apr. 22, 1924 |
| 1,549,429 | Bartlett | Aug. 11, 1925 |
| 1,751,293 | Sherman | Mar. 18, 1930 |
| 1,782,618 | Jauch | Nov. 25, 1930 |
| 2,582,332 | Homer | Jan. 15, 1952 |
| 2,617,483 | Porter | Nov. 11, 1952 |

OTHER REFERENCES

"Electrical Manufacturing," December 1947, pages 108 to 110, Electronic-Hydraulic Controls for Power, Speed, Accuracy, by Ludwig.